United States Patent
Martinez

(10) Patent No.: US 7,303,121 B2
(45) Date of Patent: Dec. 4, 2007

(54) SYSTEM AND METHOD FOR INITIALIZING FINANCIAL PRESENTATION INSTRUMENTS

(75) Inventor: Larry A. Martinez, Elkhorn, NE (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 346 days.

(21) Appl. No.: 10/855,867

(22) Filed: May 26, 2004

(65) Prior Publication Data
US 2005/0263587 A1    Dec. 1, 2005

(51) Int. Cl.
*G06K 5/00* (2006.01)
(52) U.S. Cl. ........................ 235/380; 235/382
(58) Field of Classification Search ........ 235/380, 235/493, 486, 379, 487, 382, 462.01–462.1, 235/381, 375; 705/14, 10, 39, 35, 38
See application file for complete search history.

(56) References Cited

U.S. PATENT DOCUMENTS

| | | | |
|---|---|---|---|
| 4,528,643 A | 7/1985 | Freeny, Jr. | |
| 4,700,055 A | 10/1987 | Kashkashian, Jr. | |
| 4,829,168 A | 5/1989 | Nakahara | |
| 4,884,212 A | 11/1989 | Stutsman | |
| 5,146,067 A | 9/1992 | Sloan et al. | |
| 5,220,501 A | 6/1993 | Lawlor et al. | |
| 5,255,182 A | 10/1993 | Adams | |
| 5,352,876 A | 10/1994 | Watanabe et al. | |
| 5,440,108 A | 8/1995 | Tran et al. | |
| 5,471,669 A | 11/1995 | Lidman | |
| 5,477,038 A | 12/1995 | Levine et al. | |
| 5,504,808 A | 4/1996 | Hamrick, Jr. | |
| 5,511,114 A | 4/1996 | Stimson | |
| 5,513,117 A | 4/1996 | Small | |
| 5,557,516 A | 9/1996 | Hogan | |
| 5,592,400 A | 1/1997 | Sasou | |
| 5,637,845 A | 6/1997 | Kolls | |
| 5,678,010 A | 10/1997 | Pittenger et al. | |
| 5,720,158 A | 2/1998 | Goade, Sr. | |

(Continued)

FOREIGN PATENT DOCUMENTS

CA    2300241 A1    3/2000

OTHER PUBLICATIONS

U.S. Appl. No. 10/405,043, filed Mar. 31, 2003.

(Continued)

*Primary Examiner*—Thien Minh Le
(74) *Attorney, Agent, or Firm*—Townsend and Townsend and Crew LLP

(57) ABSTRACT

The present invention provides alternative methods and systems for instantaneous initialization of financial presentation instruments, preferably stored value cards, gift cards, or other pre-paid debit cards. In one aspect of the present invention, a method for initializing financial presentation instruments is provided. The method comprises mailing a financial presentation instrument to a customer. At least an account identification (ID) associated with the presentation instrument, a monetary value to be loaded onto the presentation instrument, and a payment instrument from the customer is received. The presentation instrument is then initialized or activated to the monetary value. Typically, the receiving and initializing is carried out by an internet website, an interactive voice response (IVR) system, or a telephone customer service representative.

29 Claims, 4 Drawing Sheets

U.S. PATENT DOCUMENTS

| | | | |
|---|---|---|---|
| 5,721,768 | A | 2/1998 | Stimson et al. |
| D396,882 | S | 8/1998 | Neal, Jr. |
| 5,796,832 | A | 8/1998 | Kawan |
| 5,868,236 | A | 2/1999 | Rademacher |
| 5,903,633 | A | 5/1999 | Lorsch |
| 5,918,909 | A | 7/1999 | Fiala et al. |
| 5,921,584 | A | 7/1999 | Goade, Sr. |
| 5,936,221 | A | 8/1999 | Corder et al. |
| 5,983,003 | A | 11/1999 | Lection et al. |
| 5,984,181 | A | 11/1999 | Kreft |
| 5,987,438 | A | 11/1999 | Nakano et al. |
| 5,991,413 | A | 11/1999 | Arditti et al. |
| 5,991,748 | A | 11/1999 | Taskett |
| 6,006,988 | A | 12/1999 | Behrmann et al. |
| D429,733 | S | 8/2000 | Jones et al. |
| 6,129,275 | A | 10/2000 | Urquhart et al. |
| D436,991 | S | 1/2001 | Morgante |
| 6,169,975 | B1 | 1/2001 | White et al. |
| 6,193,155 | B1 | 2/2001 | Walker et al. |
| 6,295,522 | B1 | 9/2001 | Boesch |
| 6,298,336 | B1 | 10/2001 | Davis et al. |
| 6,370,514 | B1 | 4/2002 | Messner |
| D457,556 | S | 5/2002 | Hochschild |
| 6,386,457 | B1 | 5/2002 | Sorie |
| 6,405,182 | B1 | 6/2002 | Cuervo |
| 6,471,127 | B2 | 10/2002 | Pentz et al. |
| 6,473,500 | B1 * | 10/2002 | Risafi et al. ............ 379/144.01 |
| 6,510,983 | B2 | 1/2003 | Horowitz et al. |
| 6,543,809 | B1 | 4/2003 | Kistner et al. |
| 6,588,658 | B1 | 7/2003 | Blank |
| 6,670,569 | B2 | 12/2003 | Smith et al. |
| 6,877,656 | B1 * | 4/2005 | Jaros et al. ................. 235/380 |
| 6,999,569 | B2 * | 2/2006 | Risafi et al. ........... 379/144.01 |
| 7,004,398 | B1 * | 2/2006 | Francis et al. .............. 235/486 |
| 2001/0018660 | A1 | 8/2001 | Sehr |
| 2001/0023409 | A1 | 9/2001 | Keil |
| 2001/0023415 | A1 | 9/2001 | Keit |
| 2001/0047342 | A1 | 11/2001 | Cuervo |
| 2002/0027837 | A1 | 3/2002 | Weber |
| 2002/0161632 | A1 * | 10/2002 | Hagen et al. ................. 705/14 |
| 2002/0174016 | A1 | 11/2002 | Cuervo |
| 2002/0185543 | A1 | 12/2002 | Pentz et al. |
| 2003/0001005 | A1 * | 1/2003 | Risafi et al. ................ 235/380 |
| 2003/0010829 | A1 | 1/2003 | Krygier |
| 2003/0048888 | A1 * | 3/2003 | Hopper et al. ........... 379/114.2 |
| 2003/0053609 | A1 | 3/2003 | Risafi et al. |
| 2003/0088552 | A1 | 5/2003 | Bennett et al. |
| 2004/0117327 | A1 | 6/2004 | Smith et al. |
| 2005/0027655 | A1 * | 2/2005 | Sharma et al. ................. 705/44 |
| 2005/0065877 | A1 * | 3/2005 | Cleary et al. ................. 705/39 |
| 2005/0177423 | A1 * | 8/2005 | Swanson ..................... 705/14 |
| 2005/0246230 | A1 * | 11/2005 | Murray ....................... 705/14 |
| 2006/0065748 | A1 * | 3/2006 | Halbur et al. ............... 235/493 |
| 2007/0034689 | A1 * | 2/2007 | Jaros et al. ................. 235/380 |

OTHER PUBLICATIONS

U.S. Appl. No. 10/688,065, filed Oct. 16, 2003.
Web Page, "Charitygift: Generosity in a to-go box", at www.charitygift.com/index.jsp, Printed Aug. 30, 2004.
Web Page, "Charitygift: What to Expect", at www.charitygift.com/SelectCard?page.success=/cardshop/WhatToExpect.jsp &canFlash=yes, Printed Sep. 7, 2004.
Web Page, "Charitygift: Gift Redemption", at www.charitygift.com/redemption/EnterNumber.jsp, Printed Sep. 7, 2004.
Web Page; "Charitygift: Charitygift Registry", at www.charitygift.com/cg?pg=honr, Printed Sep. 7, 2004.
Web Page, "Charitygift: How it Works", at www.charitygift.com/docs/about_us/how_it_works.jsp, Printed Sep. 7, 2004.
Web Page, "Charitygift: How it Works: About Charitygift", at www.charitygift.com/docs/about_us/about_us.jsp, Printed Sep. 7, 2004.
Web Page, "Charitygift: Products and Services", at www.charitygift.com/docs/about_us/products.jsp, Printed Sep. 7, 2004.
Web Page, "Charitygift: Letter from Founder", at www.charitygift.com/docs/about_us/letter.jsp, Printed Sep. 7, 2004.
Web Page, "Charitygift: Questions and Answers", at www.charitygift.com/docs/help/faq.jsp, Printed Sep. 7, 2004.

* cited by examiner

SYSTEM AND METHOD FOR INITIALIZING FINANCIAL PRESENTATION INSTRUMENTS

BACKGROUND OF THE INVENTION

The present invention generally relates to financial presentation instruments. More particularly, the present invention relates to methods and systems for initializing financial presentation instruments, preferably stored value cards, gift cards, or other pre-paid debit cards.

Stored value cards, gift cards, or other pre-paid metered accounts associated with debits cards are well-known for providing access to goods and services. For example, stored value or gift cards may be purchased from various merchants such as Target®, Wal-Mart®, Starbucks®, Sears®, Blockbuster®, Macy's®, Banana Republic®, and the like. Pre-paid debit cards are also frequently purchased for telephone services. The purchase and usage of financial presentation instruments has continued to increase in recent years to the point that the sale of stored value cards, gift cards, and pre-paid debit cards today is a multi-billion dollar industry.

Stored value cards, gift cards, and pre-paid debit cards are often printed and issued with a predetermined balance and typically then sold as a retail item. An example of such a card is a pre-paid gift card which provides an individual with a set dollar amount for the purchase of goods from a particular merchant. The account is accessed and debited by using an account identification number provided on the gift card. A problem experienced in the sale of such pre-paid gift cards is that merchants buying these cards are subsequently more exposed to loss through shrinkage and theft. As such, the merchant typically stores such pre-paid gift cards under lock and key until the moment the cards are purchased. This in turn prevents stocking of such cards on store shelves freely accessible by prospective customers and increases merchant handling time and expenses. In addition, the merchant must maintain inventory stock of different values of these pre-paid gift cards well in advance of when the gift cards are actually sold as a retail item, thus restricting working capitol.

With these problems in mind, merchants have begun to display non-activated stored value cards, gift cards, and debit cards. In this way, the merchant can readily provide unfettered access of such cards to prospective customers and reduce handling time and costs as theft is no longer a concern since the non-activated debit cards have no intrinsic value. Further, merchants no longer carry a large initial expenditure since the merchant activates the debit card with a balance representing an amount a customer wishes to attribute to the debit card at the time the debit card is actually purchased by the customer.

Typically, such non-activated stored value cards, gift cards, and debit cards are activated by a provider at a merchant location or retail store at the time of purchase. Activation at a merchant or retail site is often not convenient, particularly when time is of the essence for a last minute gift. Further, a merchant site may provide limited access for a customer due to hours of operation, transportation to and from the merchant site, waiting in line, etc. Alternatively, due to the continuing increase of business over the internet, customers may now also purchase stored value and gift cards online. Current online purchases however also suffer from some drawbacks. For example, online purchases may require the customer to wait for shipment of the card, typically a minimum of twenty-four hours for physical card receipt, as well to incur shipping costs and expenses. This lack of instant activation is often inconvenient.

For these and other reasons, there is a need in the art for alternative methods and systems that provide for instant activation of financial presentation instruments, particularly stored value cards, gift cards, or other pre-paid debit cards. It would be desirable to provide methods and systems in which card initialization may be carried out easily, conveniently, and without any issues of limited access or card receipt. It would be further desirable if targeting of these financial presentation instruments could be utilized as a marketing tool. At least some of these objectives will be met by the methods and systems of the present invention described hereinafter.

BRIEF SUMMARY OF THE INVENTION

The present invention provides improved methods and systems for instantaneous initialization of financial presentation instruments, preferably stored value cards, gift cards, or other pre-paid debit cards. In one aspect of the present invention, a method for initializing financial presentation instruments is provided. The method comprises mailing a financial presentation instrument to a customer. At least an account identification (ID) associated with the presentation instrument, a monetary value to be loaded onto the presentation instrument, and a payment instrument from the customer is received. The presentation instrument is then initialized or activated to the monetary value. Typically, the receiving and initializing is carried out by an internet website, an interactive voice response (IVR) system, or a telephone customer service representative. Such methods and systems of the present invention advantageously provide for easy and convenient card activation at any desired time from a remote location such as a customer's home or work. Further, such activation methods alleviate any concerns of limited store access or waiting for physical card receipt as well as any associated shipping expenses. This is of particular benefit when time is of the essence, such as a last minute gift.

As discussed above, the presentation instrument will generally comprise a stored value, gift, or other pre-paid debit card. However, it will be appreciated that the present invention may include conventional debit cards and credit cards, e.g., ATM cards, bank cards, VISA®, Mastercard®, American Express®, etc. In one embodiment, the presentation instrument may comprise a stored value card or a gift card that has an initial zero balance or a promotional value when mailed. In the case of the latter, it is important to note that even if the card is initially set to a promotional value, the card remains non-active. For example, the gift card may have a $5 initial promotional value that is activated upon loading of the card. The presentation instruments may be initialized to any desired amount a customer wishes to load or attribute onto the card. For example, the cards may be activated to a denomination of $5, $10, $15, $20, $50, $100, or any other desired denomination. The payment instrument may likewise comprise a debit card or credit card, similar to examples noted above, or alternatively an Automated Clearing House (ACH) authorization from a banking account, e.g., savings, checking, money market, etc.

The presentation instrument generally comprises a data card having an information storage medium. The information storage medium will generally comprises a magnetic stripe or bar code that is adapted to store a unique identifier so that the debit account may be properly accessed, activated, and/or debited. The information storage medium could also comprise radio frequency identification, computer chips, or other magnetic, radio frequency, or electronic storage media that may be readable by existing card reader technology, such as conventional point of sale (POS) terminals. Generally, the unique identifier comprises the account ID provided on the presentation instrument. Still further, the presentation instrument may be associated with a personal identification number (PIN) for security measures.

Further, the present invention may employ targeting methods which are an advantageous marketing tool to generate additional sales for merchants and retailers alike. For example, targeting the mailing of the presentation instrument to a customer may be based upon a customer list, mailing list, mailing address, holiday (e.g., Christmas, Easter, Memorial Day), special event (e.g., birthday, store opening), etc. Packaging for the presentation instrument may also be included in the mailing. For example, the packaging may comprise a card carrier such as an envelope or folder with inserts, adhesives, or the like that may be used for card delivery. Additional packaging may include an insert, such as a bill statement, letter, disclosure brochure, coupon, etc.

Generally, the mailing, targeting, receiving, and/or initializing steps are carried out by a host computer system which may be in communication with the internet website, IVR system, or telephone customer service representative. The host computer system in turn is typically associated with a database management system including a database which has a record of the presentation instrument ID for access, activation, and/or debiting purposes. The initializing usually further comprises updating the database to reflect the monetary value loaded onto the presentation instrument once the presentation instrument has been accessed and the payment instrument has been successfully processed. The mailing, targeting, receiving, and/or initializing steps may be carried out a by a number of providers including independent third party service providers or directly by the merchant/retailer or presentation instrument issuer.

In another aspect of the present invention, a method for initializing financial presentation instrument comprises providing an internet website, an IVR system, or a telephone customer service representative. Any one of these modalites is configured to receive at least an account ID associated with a financial presentation instrument, a monetary value to be loaded onto the presentation instrument, and a payment instrument from a customer. The presentation instrument is then initialized to the monetary value. In yet another aspect of the present invention, a kit is provided. The kit comprises a financial presentation instrument as described above. Further, the kit includes instructions for initializing the presentation instrument according to any of the methods described herein. The activation instructions may be provided in a variety of forms, including how-to brochure, letter, or directions printed directly on the back of the presentation instrument itself.

In a further aspect of the present invention, a system for initialing financial presentation instruments is also provided. The system generally comprises a host computer and a database associated with the host computer, the database having a record of an account ID associated with a financial presentation instrument. The host computer is configured to receive at least the presentation instrument ID, a monetary value to be loaded onto the presentation instrument, and a payment instrument from a customer accessing an internet website, an IVR system, or a telephone customer service representative. The host computer is further configured to initialize the presentation instrument to the monetary value.

In a still further aspect of the present invention, a computer-readable storage medium is provided. The storage medium has a computer-readable program embodied therein for directing operation of a computer system for a provider. The computer system includes a communications system, a processor, and a storage device. The computer-readable program includes instructions for operating the computer system to activate financial presentation instruments. Instructions comprise receiving at least an account ID associated with a financial presentation instrument, a monetary value to be loaded onto the presentation instrument, and a payment instrument from a customer accessing an internet website, an IVR system, or a telephone customer service representative. Further, the program initializes the presentation instrument to the monetary value. Instructions may also include mailing the presentation instrument to customers, targeting the card to particular customers, creating a PIN associated with the presentation instrument, and/or updating the storage device to reflect the monetary value loaded onto the presentation instrument.

A further understanding of the nature and advantages of the present invention will become apparent by reference to the remaining portions of the specification and drawings.

BRIEF DESCRIPTION OF THE DRAWINGS

A further understanding of the nature and advantages of the present invention may be realized by reference to the detailed description and claims when considered in connection with the drawings, wherein like reference numerals are used throughout the several drawings to refer to similar components.

DETAILED DESCRIPTION OF THE INVENTION

Figure 1:
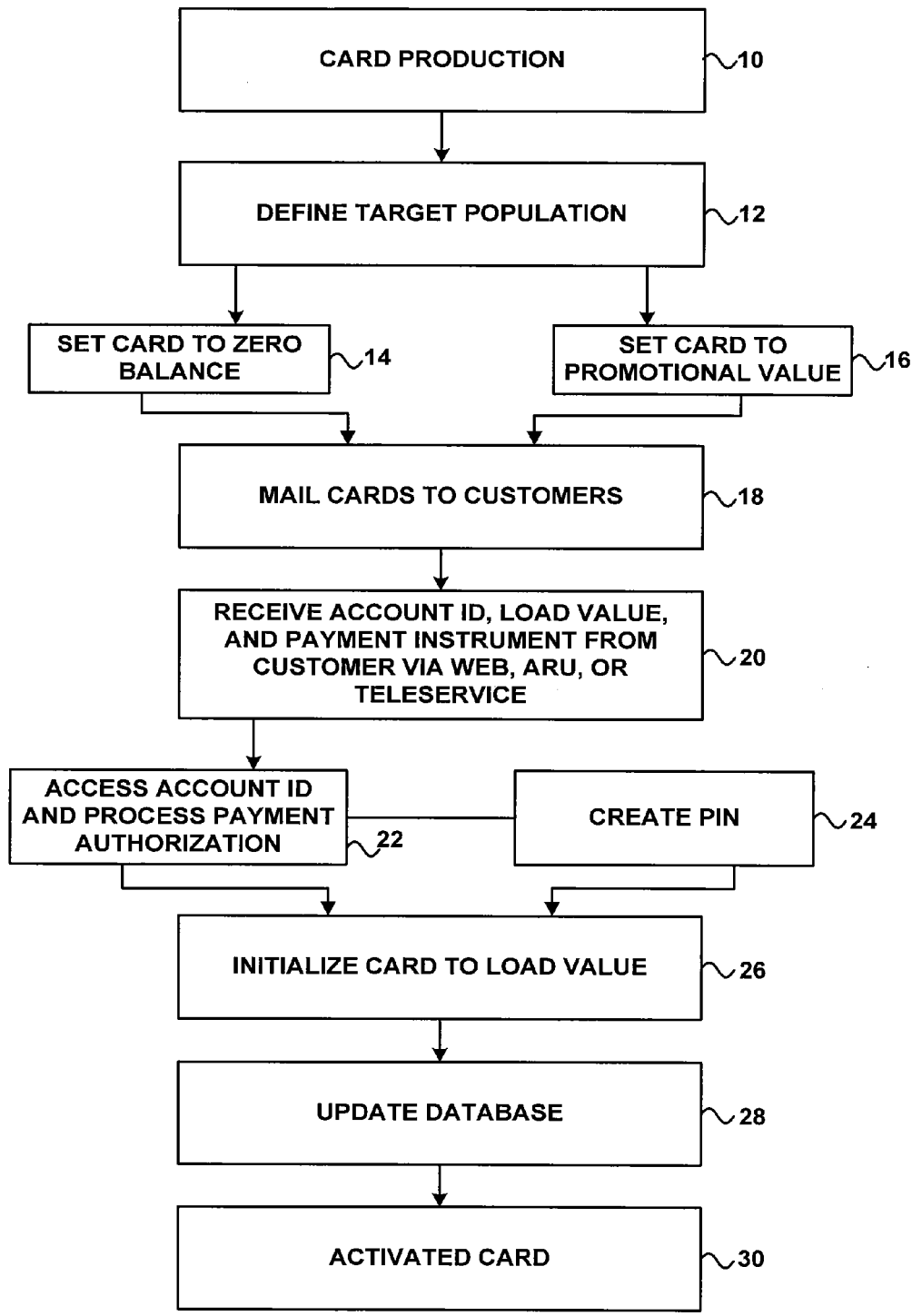
FIG. 1 is a flow diagram illustrating a method for initializing presentation instruments in accordance with one embodiment of the present invention.

Referring now to FIG. 1, a flow diagram illustrating a method for instantly initializing financial presentation instruments, such as gift cards or stored value cards, in accordance with one embodiment of the present invention is shown. The method initially comprises processing of the presentation instrument, as indicated generally by block 10 and described in more detail below with reference to FIG. 2. Card production (block 10) may generally include embossing the presentation instrument with a merchant or card issuer name, encoding the card with an account ID, and attaching it to a card carrier.

A target population for these cards may then optionally be defined, as indicated by block 12, before, after (as shown), or concurrently with card production. Targeting methods provide an advantageous marketing tool to generate additional sales for merchants and retailers alike. Card targeting (block 12) may be based upon a number of criteria including customer list, mailing list, mailing address, holiday (e.g., Christmas, Easter, Memorial Day), or special event (e.g., birthday, store opening). For example, a card issuer may track transaction activity by a customer and accordingly target such a customer for cards which provide for particular types of products from affiliated retail establishments for which the customer has been tracked. As another example, a merchant may directly target cards to customers based upon a customer list or geographic area (e.g., zip code). Still further, merchants offering private label credit cards (e.g., Sears®, General Electric®, Macy's®, Nordstrom's®) may target cards to their private label credit card holders who may have certain account balances or inactive cards in order to stimulate business at the merchant store or affiliated retail establishments. It will be appreciated that these targeting methods, of course, are only a few of several possible ways to define a card target population.

The targeted cards are typically set to an initial zero balance, as indicated by block 14. Alternatively, the presentation instrument may have an initial promotional value, as indicated by block 16. In the case of the latter, it is important to note that even if the card is initially set to an initial promotional value, the card remains non-active. For example, the gift card may have a $5 initial promotional value that is activated upon loading of the card. Setting the cards to an initial zero balance or promotional value may be carried out during or subsequent (as shown) to the card production encoding processes.

The targeted cards, along with any card carriers or optional inserts, such as a bill statement, letter, disclosure brochure, coupon, etc. are then mailed to customers, as indicated by block 18. Once the customer receives the presentation instrument in the mail, a customer may conveniently choose a variety of modalities for initialization of the card at any time from a remote location, such as a customer's home or work. For example, card initialization may be carried out by an internet website, an IVR system/automated response unit (ARU), or by a live telephone customer service representative (teleservic). The modalities are configured to receive at least the account ID associated with the presentation instrument, a monetary value to be loaded onto the presentation instrument, and a payment instrument from the customer, as indicated by block 20. It will be appreciated that the card initialization methods of the present invention are not limited to mailing presentation instruments to customers. For example, a customer may pick up some non-activated cards from their favorite retailer and easily activate them at a later time from a remote location utilizing any of the modalities discussed herein. Such activation methods alleviate any concerns of limited store access or waiting for physical card receipt as well as any shipping expenses.

Once the requisite information is received (block 20), the account ID is then accessed to confirm a match of the presentation instrument and the payment authorization for the transfer of funds processed, as indicated by block 22. Processing of the payment instrument may further comprise receiving a secondary validation and/or a payment instrument expiration date. The payment instrument may comprise a debit card or credit card, e.g., ATM cards, bank cards, VISA®, Mastercard®, American Express®, etc., or alternatively an ACH authorization from a banking account, e.g., savings, checking, money market, etc. Additionally, a PIN associated with the presentation instrument may also be created for protection against loss or theft, as indicated by block 24. Once the account ID has been successfully accessed and the payment instrument has been successfully processed, the presentation instruments may be initialized to the load value, as indicated by block 26. This load value may be any desired monetary value a customer wishes to load or attribute onto the card. For example, the cards may be activated to a denomination of $5, $10, $15, $20, $50, $100, or any other desired denomination.

Generally, the steps indicated by blocks 10-26 are carried out by a host computer system associated with a database, which is described in more detail below with respect to FIG. 3. The initializing usually further comprises updating the database to reflect the monetary value loaded onto the presentation instrument, as indicated by block 28. The activated card, as indicated by block 30, is then ready for use or for gift delivery. Further, the steps depicted by blocks 10-28 may be carried out a by a number of providers including independent third party service providers or directly by the merchant/retailer or presentation instrument issuer.

Figure 2:
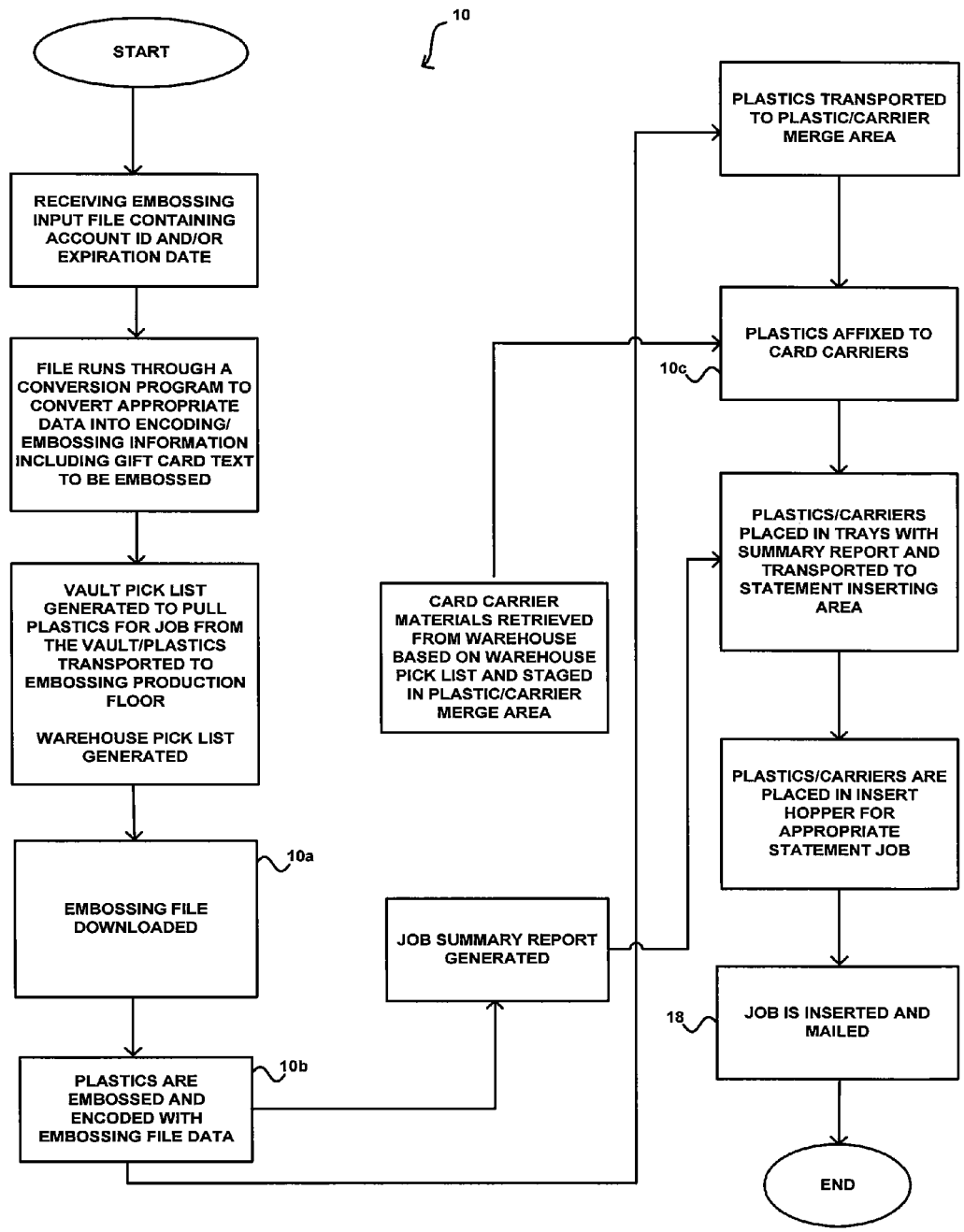
FIG. 2 is a flow diagram illustrating processing stages of the presentation instrument.

Referring now to FIG. 2, a general flow diagram illustrating the initial processing stages of the presentation instrument, including card production 10, is shown. Card processing generally includes embossing the presentation instrument with a merchant or card issuer name (block 10*a*), encoding the card with an account ID (block 10*b*), and attaching it to a card carrier (block 10*c*). The term "plastics" referenced in this figure comprises a presentation instrument. In addition, card processing is described in more detail in co-pending U.S. patent application Ser. No. 10/045,589, entitled "Systems and Methods of Providing Inserts into Envelopes" filed on Nov. 8, 2001 by Bruce A. Bennett, et al., U.S. patent application Ser. No. 10/036,653, entitled "Mail Handling Equipment and Methods" filed on Nov. 8, 2001 by Scott J. Smith, et al., and U.S. patent application Ser. No. 10/731,189, entitled "Mail Handling Equipment and Methods" filed on Dec. 8, 2003 by Scott J. Smith, et al., each of which is assigned to the assignee of the present application and incorporated herein by reference. In this example, once the cards are produced and assembled with card carriers, they are inserted into and mailed (block 18) with bill statements to respective customers.

Figure 3:
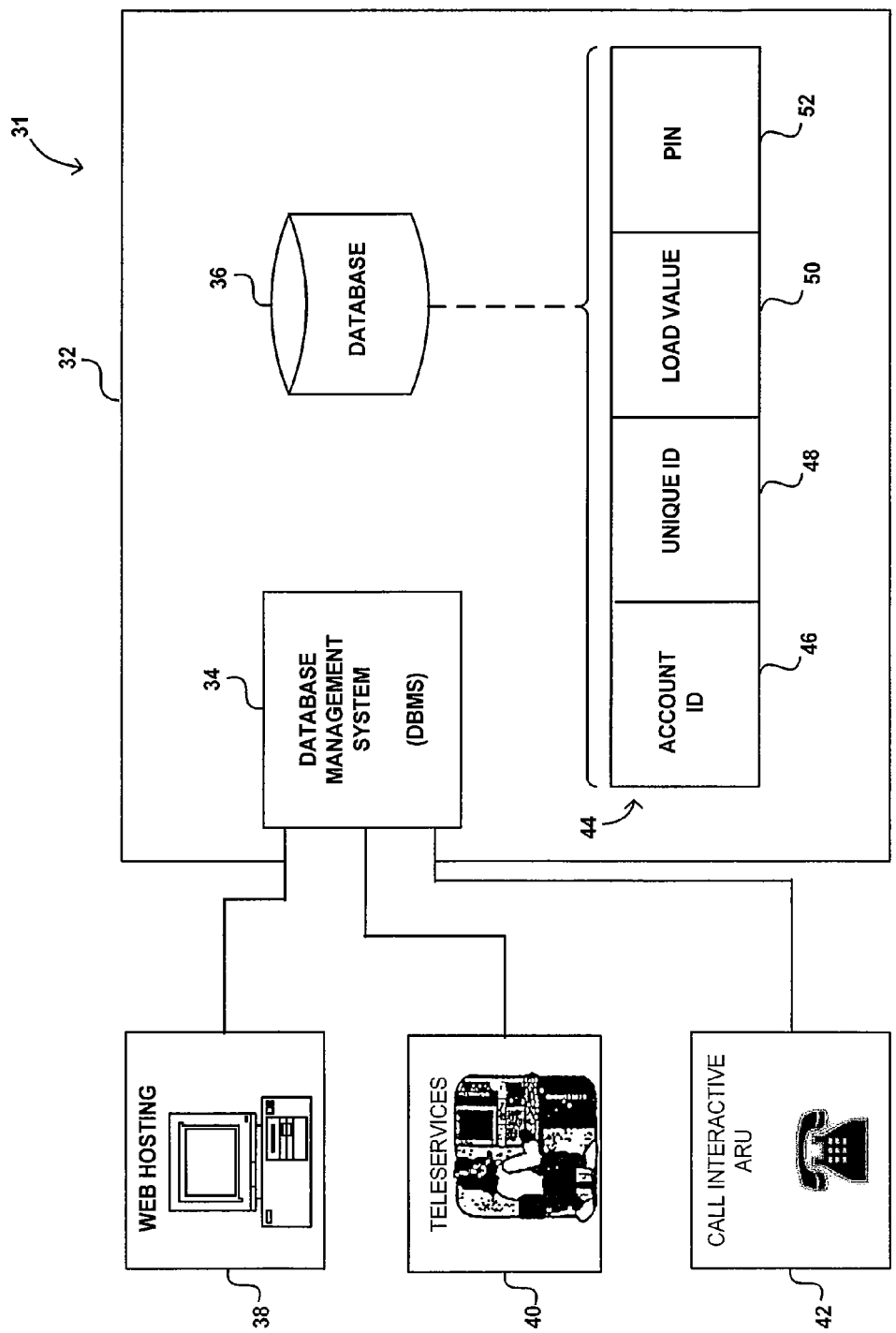
FIG. 3 is a general block diagram illustrating a system for initializing presentation instruments in accordance with one embodiment of the present invention.

Referring now to FIG. 3, a general block diagram illustrating a network 31 in accordance with one embodiment of the present invention is shown. The network 31 for initializing presentation instruments generally comprises a host computer 32 and a database management system (DBMS) 34 including a database 36 associated with the host computer 32. The host computer 32 is in communication with the internet website 38, telephone customer service representative 40, and/or ARU system 42. These modalities 38, 40, or 42 are used to access data in the database 36 via the DBMS 34. In the database 36, there is illustrated in simplified from the general content of one database table 44 for purposes of accessing and initializing the presentation instrument. The database table 44, in this example, has four fields or columns, namely a record of an account ID (card number) 46, a record for a unique identifier 48, a record for a load value 50, a record for a PIN 52. Such database fields associated with the financial presentation instrument may be utilized for access, activation, and/or debiting purposes. It will be appreciated that the database table 44 may have any number of fields, typically a minimum of two fields.

The host computer 32 is configured to receive at least the presentation instrument ID 46, a monetary value to be loaded onto the presentation instrument 50, and a payment instrument from a customer accessing the internet website 38, IVR system 42, or telephone customer service representative 40. The account ID 46 is then accessed to confirm a match of the presentation instrument and the payment instrument processed by the DBMS 34. Additionally, a PIN 52 associated with the presentation instrument may be created and saved. The host computer 32 is then configured to initialize the presentation instrument to the monetary value 48. In particular, the database record 50 is updated to reflect the monetary value loaded onto the presentation instrument.

The DBMS 34 can be a relational database management system that permits data in the database 36 to be accessed, created, maintained, manipulated and retrieved. The database 36 is likewise relational and, as conventional, stores data in tables, with the DBMS 34 using, for example, a structured query language (SQL) in order to maintain and operate the database. While the DBMS 34 and database 36 are relational in the described embodiment, those skilled in the art will appreciate that there are many types of databases (e.g., sequential flat files, hierarchical, object oriented, etc.) that can be used within the scope of the present invention. The network 31 can be implemented using known architectures and systems.

Figure 4:
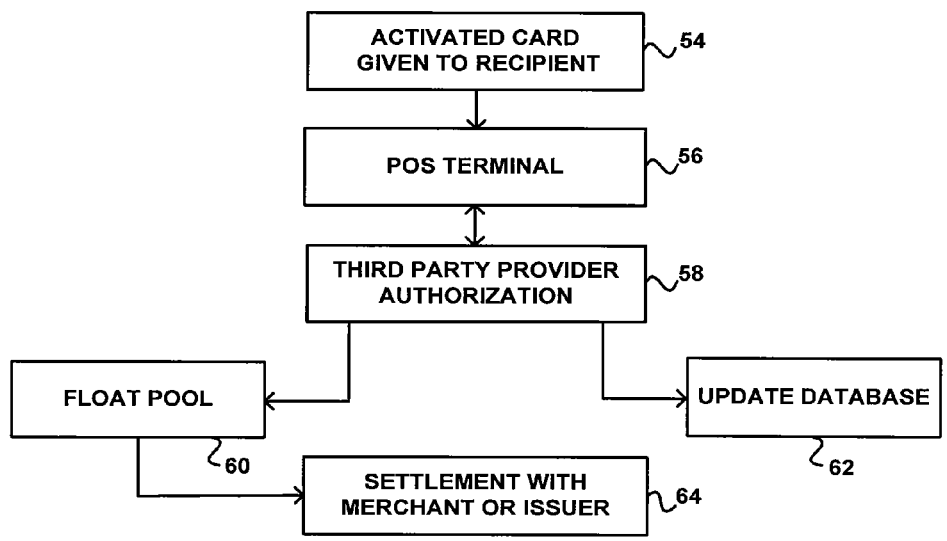
FIG. 4 is a flow diagram illustrating use of an activated presentation instrument.

Referring now to FIG. 4, a flow diagram illustrating use of an activated presentation instrument is shown. An activated card is given to a recipient, as indicated by block 54. The card may then be presented at a conventional POS terminal at a retail or merchant store to transact a purchase, as indicated by block 56. It will be appreciated that sales may also be transacted online or through teleservices. The POS terminal will read the card information (e.g., account ID), along with retail transaction data (e.g., the amount of a purchase, date, product, and other useful information). In this example, an independent third party service provider will access the account ID and load value and authorize the purchase, as indicated by block 58, if the purchase amount is less than or equal to the load value. Typically, the database holding the account information will be updated to post the transaction and debit the purchase amount from the load value, as indicated by block 62. Further, a float pool is decremented for the purchase amount, as indicated by block 60, and funds are accordingly transferred to the merchant or issuer, as indicated by block 64. It will be appreciated that there are several methods and systems for transacting sales with presentation instruments. Further examples are described in more detail in co-pending U.S. patent application Ser. No. 10/405,043, entitled "Methods and Systems for Processing Unrestricted Stored-Value Instruments" filed on Mar. 31, 2003 by Christopher R. McGee, et al., and U.S. patent application Ser. No. 10/688,065, entitled "Discount-Instrument Methods and Systems" filed on Oct. 16, 2003 by Christopher R. McGee, et al., each of which is assigned to the assignee of the present application and incorporated herein by reference.

Figure 5:
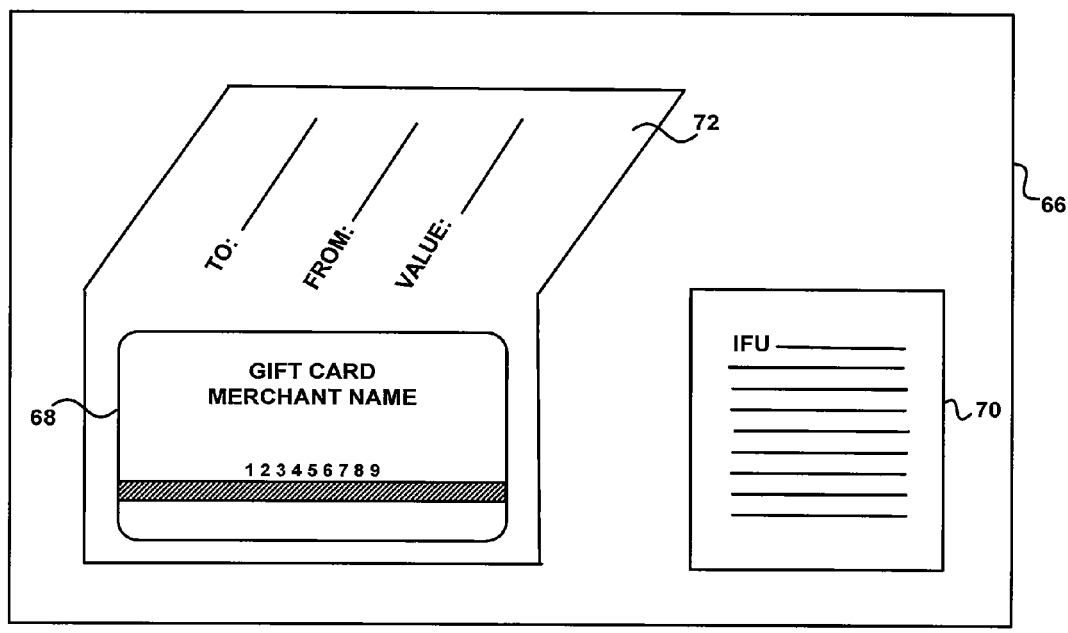
FIG. 5 illustrates a kit constructed in accordance with one embodiment of the present invention.

Referring now to FIG. 5, a kit 66 constructed in accordance with one embodiment of the present invention is illustrated. The kit generally comprises a presentation instrument 68 and instruction for use (IFU) 70. As discussed above, the presentation instrument will generally comprise a stored value, gift, or other pre-paid debit card. The presentation instrument 68 may comprise a variety of shapes and sizes depending on how the card is to be packaged and as such is not limited to conventional or standard credit card size. In this example, the card 68 has a rectangular shape with an information storage medium comprising a magnetic stripe 74. In addition, the card 68 is embossed with the merchant name and the account ID number. The card is attached to a card carrier 72, such as an envelope or folder which may be used for gift delivery. The IFU 70 includes instructions for initializing the presentation instrument according to any of the methods described herein. The IFU 70 may be provided in a variety of forms, including how-to brochure, letter, etc. Further, additional inserts (now shown) may accompany the kit 66, including bill statements, coupons, etc.

Although certain preferred embodiments and methods have been disclosed herein, it will be apparent from the foregoing disclosure to those skilled in the art that variations, modifications, alternative constructions, and equivalents of such embodiments and methods may be made without departing from the true spirit and scope of the invention. Therefore, the above description should not be taken as limiting the scope of the invention which is defined by the appended claims.

What is claimed is:

1. A method for initializing unsolicited financial presentation instruments, the method comprising:

mailing a financial presentation instrument to a potential customer, wherein the mailing is a targeted communication based on a list, and wherein the mailing of the presentation instrument is unsolicited by the potential customer and without the potential customer having a pre-existing account that is associated with the presentation instrument;

receiving at least an account identification (ID) associated with the presentation instrument and a monetary value to be loaded onto the presentation instrument-from the customer, wherein the account ID is visually obtained directly from the presentation instrument by the customer;

initializing the presentation instrument to the monetary value; and wherein receiving and initializing is carried out by an internet website, an interactive voice response (IVR) system, or a telephone customer service representative.

2. The method of claim 1, wherein the presentation instrument comprises a stored value card or a gift card.

3. The method of claim 1, wherein the presentation instrument comprises a zero balance or promotional value when mailed until the presentation instrument is activated.

4. The method of claim 1, wherein the presentation instrument comprises a data card having an information storage medium that is adapted to store a unique identifier.

5. The method of claim 4, wherein the unique identifier comprises the presentation instrument ID.

6. The method of claim 4, wherein the information storage medium comprises a magnetic stripe or a bar code.

7. The method of claim 1, further comprising creating a personal identification number (PIN) associated with the presentation instrument.

8. The method of claim 1, wherein the payment instrument comprises a debit card, credit card, or Automated Clearing House (ACH) authorization from a bank account.

9. The method of claim 1, wherein receiving and initializing is carried out by a host computer system which has a record of the presentation instrument ID.

10. The method of claim 9, wherein initializing further comprises updating a database associated with the host computer to reflect the monetary value loaded onto the presentation instrument.

11. The method of claim 1, wherein the receiving and initializing is carried out by a third party service provider, merchant, or instrument issuer.

12. The method of claim 1, further comprising targeting the mailing of the presentation instrument based upon a customer list, mailing list, mailing address, holiday, or special event.

13. The method of claim 1, further comprising providing packaging for the presentation instrument.

14. A method for initializing financial presentation instruments, the method comprising:
providing an internet website, an IVR system, or a telephone customer service representative that receives at least an account ID associated with a financial presentation instrument, and a monetary value to be loaded onto the presentation instrument from a potential customer, wherein the account ID was received visually from the potential customer who was mailed the presentation instrument on an unsolicited basis and without the potential customer having a pre-existing account that is associated with the presentation instrument; and
initializing the presentation instrument to the monetary value.

15. The method of claim 14, wherein the presentation instrument comprises a stored value card or a gift card.

16. A kit comprising:
a financial presentation instrument; and
instructions for initializing the presentation instrument according to claim 14.

17. The kit of claim 16, farther comprising packaging for the presentation instrument.

18. The kit of claim 16, wherein the presentation instrument comprises a stored value card or a gift card.

19. The kit of claim 16, wherein the presentation instrument comprises an initial zero balance or promotional value.

20. The kit of claim 16, wherein the presentation instrument comprises a data card having an information storage medium that is adapted to store a unique identifier.

21. The kit of claim 20, wherein the unique identifier comprises the presentation instrument ID.

22. The kit of claim 20, wherein the information storage medium comprises a magnetic stripe or a bar code.

23. The kit of claim 16, wherein the presentation instrument has an associated PIN.

24. A system for initializing financial presentation instruments, the system comprising:
a host computer; and
a database associated with the host computer, the database having a record of an account ID associated with a financial presentation instrument, wherein the financial presentation instrument includes the account ID in a visually accessible form;
wherein the host computer is configured to receive at least the presentation instrument ID, and a monetary value to be loaded onto the presentation instrument from a potential customer accessing an internet website, an IVR system, or a telephone customer service representative;
wherein the presentation instrument ID is obtained visually from the presentation instrument the potential customer who was mailed the presentation instrument on an unsolicited bases and without the potential customer having a pre-existing account that is associated with the presentation instrument; and
wherein the host computer is configured to initialize the presentation instrument to the monetary value.

25. The system of claim 24, wherein the presentation instrument comprises a stored value card or a gift card.

26. A computer-readable storage medium having a computer-readable program embodied therein for directing operation of a computer system for a provider, the computer system including a communications system, a processor, and a storage device, wherein the computer-readable program includes instructions for operating the computer system to activate financial presentation instruments in accordance with the following:
receiving at least an account ID associated with a financial presentation instrument, and a monetary value to be loaded onto the presentation instrument from a potential customer accessing an internet website, an IVR system, or a telephone customer service representative;
wherein the account ID was visually obtained directly from the presentation instrument by the potential customer who was mailed the presentation instrument on an unsolicited basis and without the potential customer having a pre-existing account that is associated with the presentation instrument; and
initializing the presentation instrument to the monetary value.

27. The computer-readable storage medium of claim 26, wherein the presentation instrument comprises a stored value card or a gift card.

28. The computer-readable storage medium of claim 26, wherein the computer-readable program further includes instructions for creating a PIN associated with the presentation instrument.

29. The computer-readable storage medium of claim 26, wherein the computer-readable program further includes instructions for updating the storage device to reflect the monetary value loaded onto the presentation instrument.

* * * * *